United States Patent [19]

Sehr et al.

[11] Patent Number: 4,961,173
[45] Date of Patent: Oct. 2, 1990

[54] CONTROL SENSOR FOR A CONSTRUCTION MACHINE

[75] Inventors: Willibald Sehr, Waldburn-Ellar; Martin Zarniko, Diez, both of Fed. Rep. of Germany

[73] Assignee: Moba-Electronic Gesellscharft fur Mobil-Automation mbH, Fed. Rep. of Germany

[21] Appl. No.: 349,624

[22] Filed: May 10, 1989

[30] Foreign Application Priority Data

May 11, 1988 [DE] Fed. Rep. of Germany ....... 3816198

[51] Int. Cl.$^5$ .............................................. G01S 15/00
[52] U.S. Cl. ........................................ 367/96; 367/907
[58] Field of Search ................... 367/95, 96, 106, 907, 367/19, 16; 405/160, 161

[56] References Cited

U.S. PATENT DOCUMENTS 4,025,895  5/1977  Shatto ................................. 367/106

Primary Examiner—Thomas H. Tarcza
Assistant Examiner—Daniel T. Pihulic
Attorney, Agent, or Firm—Finnegan, Henderson, Farabow, Garrett & Dunner

[57] ABSTRACT

A control sensor for a construction machine serves for generating height control signals for the height control of a tool of the construction machine along a guide cable and contains at least two supersonic sensors, one of which at least serves as a transmitter/receiver element, whereby the supersonic sensors are connected to an evaluation means and arranged in a right angle to the construction machine's direction of movement and in such a distance to the guide cable that the detection angle of the supersonic cones will lead, at this distance, to their overlapping.

6 Claims, 3 Drawing Sheets

CONTROL SENSOR FOR A CONSTRUCTION MACHINE

FIELD OF THE INVENTION

The present invention refers to a control sensor for a construction machine which generates to a driver signals for the elevation control of a tool of the construction machine along a guide cable.

BACKGROUND OF THE INVENTION

A prior art control sensor used for controlling a grader or a similar construction machine mechanically traces the guide cable and thereby generates signals of height and direction control indicating the relative position of the sensor to the guide cable. Thus, the prior art mechanical control sensor has to fulfill two functions, i.e. the generation of a height control signal for the vertical adjustment of a ground-working tool and the generation of a direction control signal with which, for example, a necessary correction of direction of a movement may be indicated to a dirver on a direction indicator unit. Attention has to be drawn to the fact that the height control signal must be generated with the highest precision possible to meet with today's demands of road construction. However, by nature the mechanical sensor proves to be susceptible to damages which may easily occur during rugged activities in the field of road construction. More and more functions are integrated into today's construction machinery to increase their efficiency. Therefore, the driver or operator of the construction machine has to control and supervise a great deal of operational stages. A relief for the driver of these perpetually occurring standard functions can only be achieved to some extent by the prior art control sensor, as it is not suitable to inform the operator of an excessive deviation of the direction. Also, the prior art control sensor may not recognize an abandonment of the guide cable due to an incorrect direction control of the construction machine through which the construction machine could do considerable damage.

It is known from DE-U-87 13 874 of the applicant to make use of a supersonic distance control device for the purpose of measuring the distance with respect to ground in the field of road construction. A supersonic distance gauging device of this kind is unsuitable for the purpose of generating a height control signal for indicating the distance of the distance gauging device to the guide cable with an accuracy adequate to the control of a construction machine as a lateral misalignment of the guide cable towards the distance gauging device would lead to an incorrect—indicating too great a height—height control signal, thus the man skilled in the present field restricts the use of this supersonic distance gauging device, while demanding a high standard of accurate control, to such purposes where the aim is the supersonic distance measurement of the distance of a surface to the sensor where such measuring errors cannot occur. Therefore, the only indicated field of application of this supersonic distance gauging device is the determination of distance to a surface, as mentioned in the DE-U.

U.S. Pat. No. 4,240,152 discloses an obstacle detecting means for vehicles where severe supersonic sensors are arranged parallel to the vehicle's bumper. These supersonic sensors serve the purpose of detecting obstacles, for example when the vehicle is reversing, which may be arranged in the "blind spot".

U.S. Pat. No. 4,623,032 discloses a supersonic distance measuring appliance for remote control vehicles which comprises two supersonic sensors to detect the position of an obstacle situated in the space in front of the vehicle.

DE-A-35 18 613 discloses an obstacle registration system to register the position of an obstacle by means of a plurality of supersonic sensors which can be differently controlled with regard to their phases.

SUMMARY OF THE INVENTION

In view of this state of the art, the present invention is based on the object of improving a control sensor for a construction machine of the above-mentioned kind for generating signals of height and/or direction control by detecting the relative position of the control sensor towards a guide cable, such that the control sensor will be resistant to damages while maintaining the control signals' high accuracy.

This object is achieved in accordance with the invention by a control sensor for a construction machine for generating height control signals by detecting the sensor's relative position to a guide cable, wherein the control sensor comprises at least two supersonic sensors at least one of which serves as a transmitter receiver element, the supersonic sensors are connected to an evaluation means which serves to generate the height control signals, and the supersonic sensors are arranged in a right angle to the direction of movement of the construction machine and are arranged in such a distance to the guide cable that the detection angles of the supersonic sensor cones lead to their overlapping at such distance.

The invention submitted here is based on the realization that, differing from the widely held views in this field of technics, a control of a construction machine towards a guide cable may then be accomplished with a supersonic control sensor instead of a mechanical sensor, if the control sensor comprises several supersonic sensors which are connected to the evaluation device in order to generate signals of height and/or direction control and if these are arranged in a right angle to the construction machine's direction of movement and essentially right-angles to the guide cable so that the detection angles of the sonic cones lead to their overlapping at this distance. When arranging, according to the invention, several supersonic sensors within the building machine's control sensor, the error in measurement, engendered by the determination of height through the lateral misalignment of the guide cable to the middle axis of one single supersonic sensor, will stay by appropriate choice of spacing of the supersonic sensors to each other on a very low level. Thus, for the first time a determination of distance to the guide cable may be accomplished with such accuracy, using the layout in accordance with the invention, that the supersonic sensors commonly through too inaccurate in their measuring method for the purpose of height control of a construction machine are henceforth surprisingly suitable for their use in a construction machine. When using several supersonic sensors arranged vertically to the direction of movement of the construction machine, it is furthermore possible to generate signals of direction control in addition to the signals of height control, so that the possible functions of the mechnical tracing sensor used until now may be fully substituted by the control sensor with supersonic gauging. Also the control sensor according to the invention is suited to generate sensor signals of such a kind as to indicate an excessive deviation of direction to the construction machine's driver. The driver resp. operator of the construction machine may therefore primarily concentrate on other tasks than on the observance of exact direction. Damages due to a deviation of direction of the construction machine, the deviation leading to abandon the guide cable are ruled out.

BRIEF DESCRIPTION OF THE DRAWINGS

With reference to the drawings enclosed, preferred embodiments of the invention will be explained hereinafter. In the drawings.

DESCRIPTION OF THE PREFERRED EMBODIMENTS

Figure 1:
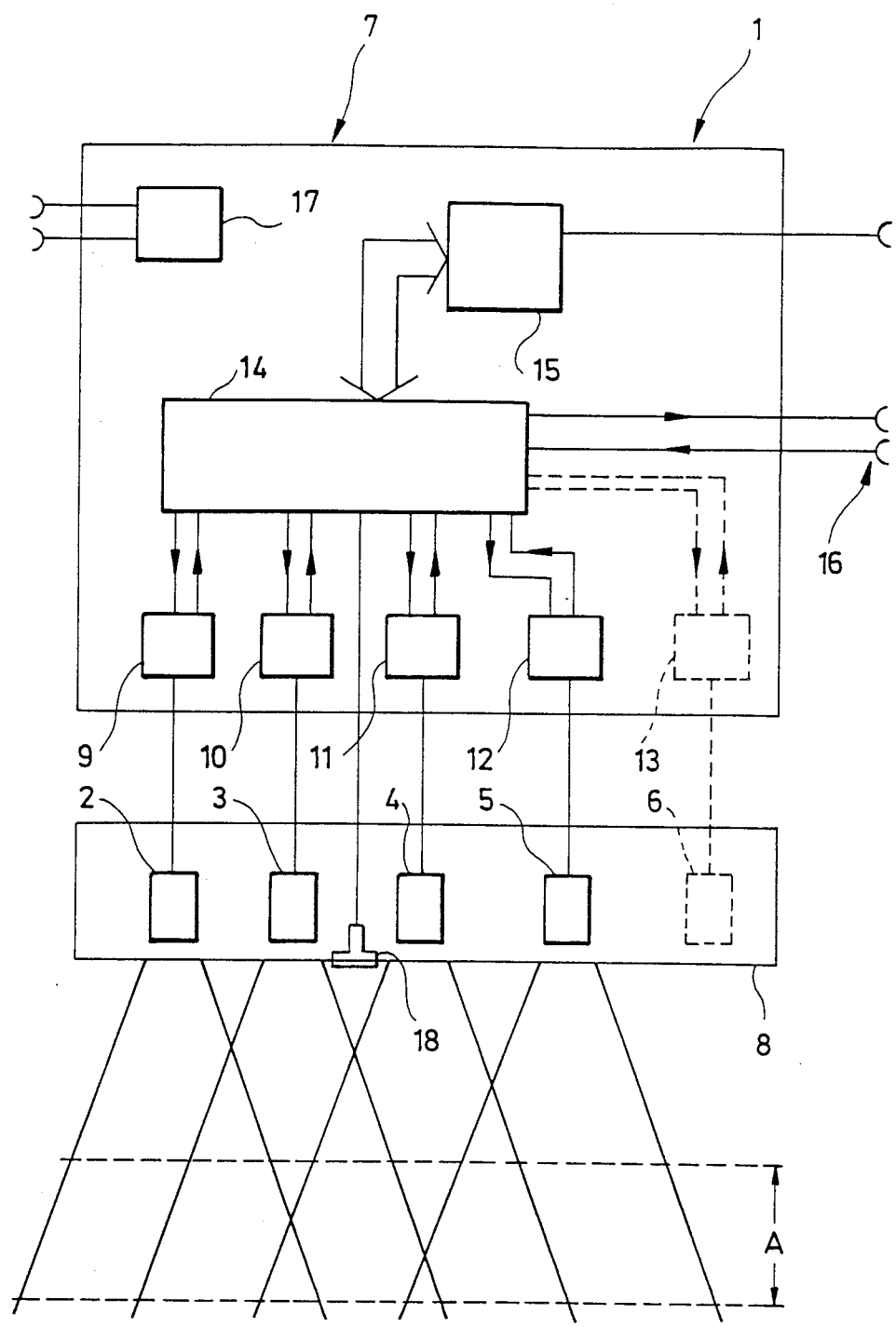
FIG. 1 shows a block diagram of a supersonic distance gauging device according to a preferred embodiment of the invention.

A supersonic distance gauging device 1, its block diagram is shown in FIG. 1, comprises, in case of the depicted embodiment, four supersonic sensors 2 to 5. A further supersonic sensor 6 is indicated by a dotted line to illustrate that more than four sensors can be provided for. There is, however, a preferred arrangement of the four sensors 2 to 5 as this number is especially suitable for the use in construction machinery.

The distance gauging device also contains an evaluation means 7 to which the supersonic sensors 2 to 6 are connected.

FIG. 1 further shows schematically that the supersonic sensors 2 to 6 are arranged side-by-side and may be cast in a block of plastic 8 which is also indicated schematically in FIG. 1.

The evaluation means resp. evaluation circuit 7 comprises a number of transmitter/receiver circuits 9 to 12 resp. 9 to 13 corresponding to the number of sensors. As indicated in FIG. 1, the sensors 2 to 6 are each connected to a transmitter/receiver circuit 9, 10, 11, 12 resp. 13. The transmitter/receiver circuits 9 to 13 excite cyclically on the one hand of the supersonic sensors 2 to 6 to emit a supersonic signal and measure on the other hand the object's echo transit time between transmitting a supersonic signal and receiving the respective object echo, of an objects echo emitted by a first or one of the other supersonic sensors 2 to 6, reflected by an object to be measured in relation to its distance to the respective sensors, and received by the first or the further supersonic sensors 2 to 6.

For this purpose the supersonic sensors 2 to 6 are arranged in a parallel manner and an even distance from each other (preferably 5 to 10 cm) in the block 8. Hereby the mutual distance of the supersonic sensors 2 to 6 is chosen such that an overlapping of the supersonic cones with detection angles of, for example, 10 degrees, which are generated by these supersonic sensors 2 to 6, will happen at a minimal measuring distance desired at a preferred approximate 40 cm. In FIG. 1 the measuring range of the distance gauging device 1 is indicated by A.

The evaluation means 7 comprises a microcomputer 14, where two respective control inputs of the transmitter/receiver circuits resp. transmitter/receiver units 9 to 13 are directly connected to the microcomputer 14. This may, for example, be a standard microcomputer of the type 8031. The microcomputer 14 is not only able to produce an analogous signal via a digital-to-analogue converter 15, but also to pass on the data via serial interface 16.

Either a distance resp. clearance signal or a control signal is generated at the output of the microcomputer 14 to change the construction machine's level of operation. As a matter of completeness it should be mentioned that the evaluation means 7, which may also be described as transmitter/receiver circuit, is in this case equipped with a mains circuit connection. Furthermore, block 8 contains a temperature sensor 18 which is also connected to the microcomputer 14.

Figure 2A:
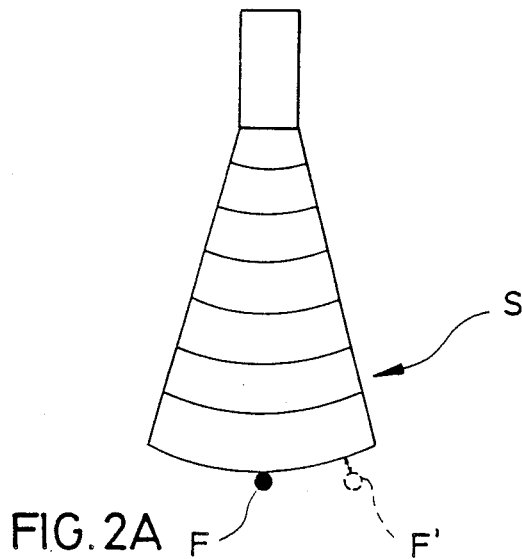
FIGS. 2A, 2B show a diagrammatical simplified representation of the mode of operation of the distance gauging device in accordance with the invention in comparison to the one of a prior art distance gauging device (according to FIG. 2A)

Hereinafter, reference is made to FIGS. 2A and 2B, which, in comparison, show the particular advantages of the inventive distance gauging device. FIG. 2A shows the block diagram of a conventional distance gauging device with a single supersonic sensor S to detect a guide means F, for example a tense cable. If, with such a gauging device, the object resp. guide means F is not situated vertically below the sensor S, an error will result as the guide appliance does not touch the circular line for the same sonic transit times. If a sensor S with a wider detection angle is used, the guide means F could still be detected even if shifted further aside than shown in FIG. 2A due to the wider angled sonic cone, however, increased errors in measurement will also occur.

Figure 2B:
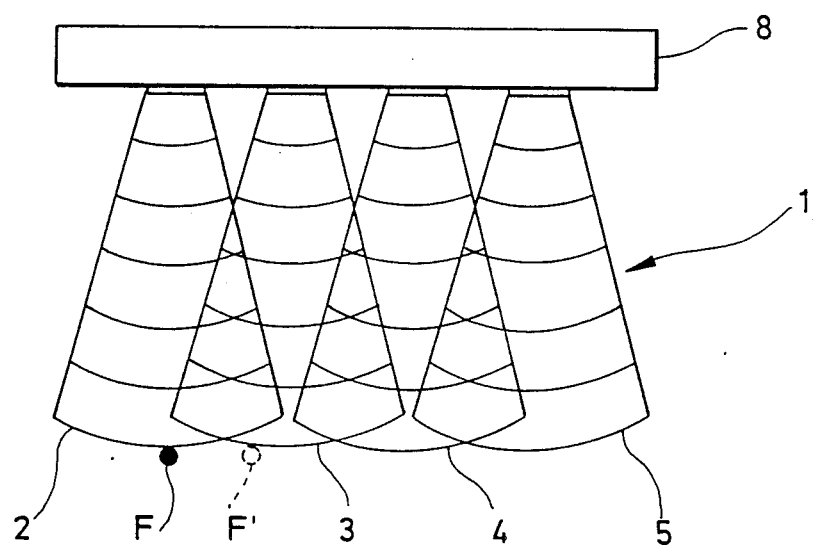

As shown in block diagram FIG. 2B of an embodiment of the inventive distance gauging device 1, these errors can be avoided by using several supersonic sensors 2 to 5. This becomes evident from the layout of guide appliance F resp. F' positioned further aside.

Figure 3:
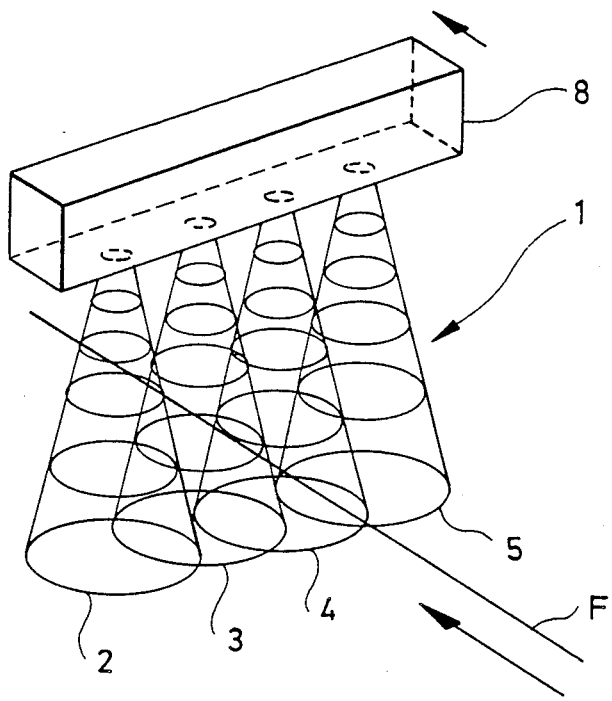
FIG. 3 shows a perspective representation of a supersonic sensor group.

With reference to FIG. 3, the employment of the embodiment of the inventive supersonic distance gauging device 1 for the determination of position relative to a guide cable F will be explained in the following. In this diagram, as in the diagrams FIGS. 4 to 5, only the sensors and the block of plastic are depicted whereas the evaluation device, through part of the gauging device, is not depicted. However, the illustrations chosen are sufficient to explain the mode of operation.

In the type of realization according to FIG. 3, the supersonic sensors 2 to 5 are arranged across to the direction of movement and, therefore, across the guide cable F. Here preferably the middle supersonic sensors 3, 4 will firstly be excited to transmit supersonic signals and are thereafter switched to receive. Should the distance of the supersonic sensors 3, 4 to the ground below the cable F become less than the maximum measuring distance, which is determined by the time during which the respective transmitter/receiver unit remains switched to receive, the supersonic distance gauging device 1 will detect a first echo generated from the cable F and a further echo corresponding to the ground echo. The respective echo transmit times are stored. Accordingly, the left supersonic sensor 2 and the right supersonic sensor 5 in FIG. 1 will be activated.

When the ground is within reach of the sensors, all four supersonic sensors 2 to 5 will register approximately the same echo transmit times of the supersonic signal reflected from the ground. Only the transmit time of the signal reflected from guide cable F is shorter.

Accordingly, the distance of guide cable F to the respective sensor below which the guide cable F is positioned can be identified as well as the position of the guide cable F within reach of either supersonic sensor 2, 3, 4 or 5. Based on this information, a construction machine can, by means of the inventive supersonic distance gauging device, be controlled as far as its operating height is concerned, and it is possible to generate an additional signal of direction. The outer sensors 2 and 5 can be used for this purpose as warning sensors which release a warning signal when a middle range of width is exceeded. In a practical employment this may be realized by an optical display in different colours.

The supersonic distance gauging device 1 can be equipped with a reference echo element if this is required for reasons of measuring precision.

We claim:

1. Control sensor for a construction machine for generating height control signals by detecting the relative position of the sensor to a guide cable, wherein:
   the control sensor comprises at least two supersonic sensors, at least one of which serves as a transmitter/receiver element;
   the supersonic sensors are connected to an evaluation means which serves to generate the height control signals and a signal of direction which indicates the exceeding of a certain range of width; and
   the supersonic sensors are positioned at a right angle to the direction of movement of the construction machine, and are arranged at a distance from the guide cable that detection angles of supersonic sensor cones generated by said supersonic sensors overlap at said distance.

2. Control sensor according to claim 1, wherein the supersonic sensors are cast in a block of plastic in equidistant spaced-apart relation.

3. Control sensor according to claim 2, wherein the supersonic sensor cones overlap at a distance of 40 cm from said supersonic sensors to said guide cable.

4. Control sensor according to claim 1, wherein the evaluation device comprises a number of transmitter/receiver circuits corresponding to the number of supersonic sensors with each transmitter/receiver circuit being connected to a supersonic sensor.

5. Control sensor according to claim 4, wherein the supersonic sensors are connected to a microcomputer via the transmitter/receiver circuits.

6. Control sensor according to claim 5, wherein the evaluation device further comprises an analog-to-digital converter connected to the microcomputer.

* * * * *